Figure 1:
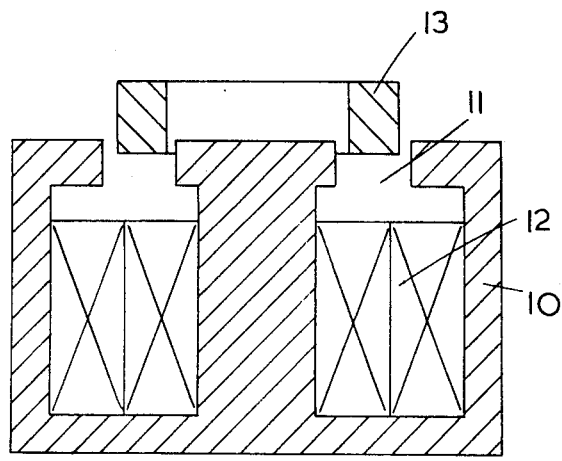

United States Patent [19]

Thomas et al.

[11] 3,955,164

[45] May 4, 1976

[54] ELECTROMAGNETIC FORCE APPLYING DEVICE

[75] Inventors: Alan Thomas, Stratford on Avon; Ronald Alfred Heath, Birmingham, both of England

[73] Assignee: Lucas Aerospace Limited, Birmingham, England

[22] Filed: Nov. 26, 1974

[21] Appl. No.: 527,309

Related U.S. Application Data

[63] Continuation of Ser. No. 406,101, Oct. 12, 1973, abandoned.

[30] Foreign Application Priority Data

Oct. 12, 1972 United Kingdom............... 47073/72

[52] U.S. Cl.................................. 335/217; 336/30
[51] Int. Cl.²......................................... H01F 7/08
[58] Field of Search ............... 336/30, 179; 335/217

[56] References Cited

UNITED STATES PATENTS

| 2,446,353 | 8/1948 | Wittmann ........................... 335/217 |
| 2,794,090 | 5/1957 | Ertl et al............................ 335/217 |
| 3,009,084 | 11/1961 | Balliett.............................. 335/217 |
| 3,126,518 | 3/1964 | Johannson ...................... 335/217 X |
| 3,533,032 | 10/1970 | Schindel et al. ................... 335/217 |

*Primary Examiner*—G. Harris
*Attorney, Agent, or Firm*—Holman & Stern

[57] ABSTRACT

An electromagnetic force applying device comprises a core with an annular air gap, a coil for creating a radial magnetic field in the air gap and an armature ring movable axially in the air gap. The core and the ring are of different magnetic materials with different coefficients of thermal expansion so that the force applied to the ring when a given current flows through the coil varies with temperature.

2 Claims, 2 Drawing Figures

ELECTROMAGNETIC FORCE APPLYING DEVICE

This is a continuation of application Ser. No. 406,101, filed Oct. 12, 1973, now abandoned.

This invention relates to an electromagnetic force applying device of the kind comprising a core having an annular gap, a winding on the core for producing a substantially radial magnetic field in the gap and an annular armature which is drawn into said gap by said field.

Such a device produces a pull given by the expression $$F = k \times \frac{(AT)^2 d}{g}$$

where F is the force

AT is the number of ampere turns applied to the gap $d$ is the mean diameter of the gap and $\epsilon$ is the difference between the radial width of the gap and the radial width of the armature.

Where, as is conventional both the core and the gap are made of the same material, the pull will not vary with temperature. It is however required to use devices of this type in situations where the force is required to vary with temperature, for example in a force balance type fluid pressure transducer where the fluid pressure is applied to a bellows which is subject to thermal expansion.

It is accordingly an object of the invention to provide a device of the kind specified in which the force varies with temperature.

According to the invention a device of the kind specified has its armature and its core made of different magnetic materials having different coefficients of thermal expansion.

The invention also resides in an electromagnetic fluid pressure transducer comprising a fluid pressure sensing device which is subject to thermal expansion and which is adapted to apply a force proportional to the pressure sensed and also proportional to its effective area, an electromagnetic force applying device comprising a core, having an annular gap, a winding on the core for producing a radial magnetic field in the gap and an armature arranged in the gap, said armature being formed of a material having a higher coefficient of thermal expansion than the material of the core, said electromagnetic force applying device and said pressure sensing device being arranged to apply opposite forces to a position sensing device and a control circuit for controlling the current supplied to said electromagnetic device in accordance with the output of the position sensing device.

Figure 2:
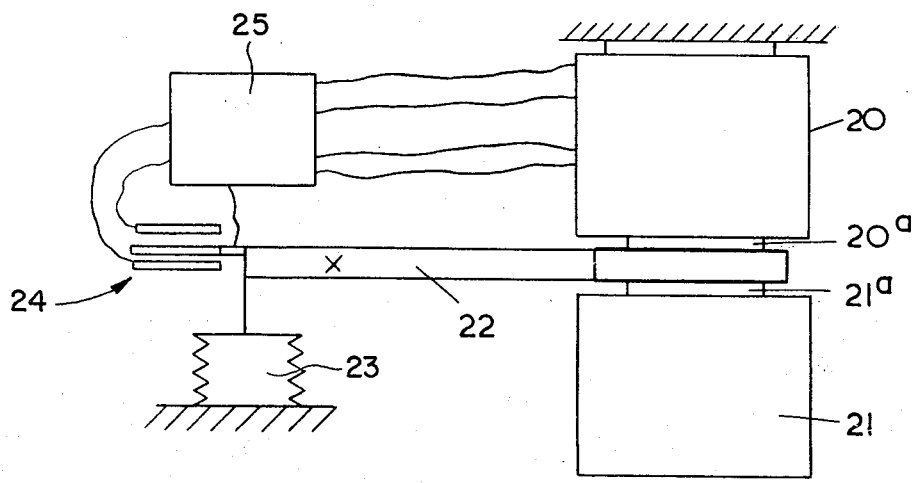

In the accompanying drawings:

FIG. 1 is a sectional view showing an example of an electromagnetic force applying device in accordance with the invention, and FIG. 2 is a diagram of an electromagnetic fluid pressure transducer incorporation the device of FIG. 1.

Referring firstly to FIG. 1 the device shown comprises a core 10 having an annular gap 11. This core is formed entirely of 40–50% nickel iron having a coefficient of thermal expansion in the region of 8 × 10⁻⁶ per °C. A winding 12 is provided on the core 10 which forms, in use, a radial magnetic field in the gap 11. In fact, the winding 12 consists of two coils as will be explained hereinafter.

The device also includes an armature 13 in the form of a ring of soft iron having a coefficient of thermal expansion in the region of 12 × 10⁻⁶ per °C. Since the material of the armature has a higher coefficient of expansion than the material of the core the radial width of the armature will increase more than the radial width of the gap, thereby decreasing the difference between these widths and increasing the ratio $d/g$. An increasing force is therefore obtained as the temperature rises. The rate of increase in the force depends on the initial sizes of the gap and the armature and these can be chosen to give substantially any required rate.

FIG. 2 shows diagrammatically a fluid pressure transducer in which a pair of the devices shown in FIG. 1 are employed. The two devices 20, 21 have their armatures 21a, 20a attached to a lever 22 and act in opposite directions on this lever. One coil of each winding is supplied with a constant polarising current so that equal and opposite pulls are applied to the armatures 21a, 20a. The other coils are connected in series but in opposite senses so that a current through the coils increases the pull on one armature and decreases the pull on the other.

The net force on the lever 22 is required to counterbalance the force applied to the lever by a flexible resilient sealed bellows 23 which is evacuated and which is subjected externally to the pressure to be measured. Since the bellows is subject to thermal expansion its effective area will increase with temperature and thus the force applied to the lever 22 by any given pressure will increase with temperature. Since it is required that the current supplied to the device 20, 21 should be linearly related to the pressure, it will be seen that appropriate choice of the dimensions of the gap and armatures of the devices 20, 21 will enable the temperature coefficients of the two forces applied to the lever to be accurately matched over a range of temperatures.

The position of the lever 22 is sensed by a capacitive position sensing device 24 which supplies an electrical control signal for a control circuit 25 controlling the current to the devices 20, 21. Details of the circuit and the device 24 may be found in our British Patent Application No.'s 36460/72 and 36461/72.

In other applications it may be desirable to provide an electromagnetic force applying device with a negative temperature coefficient, i.e. in which the force decreases with rising temperature. This can be achieved by making the armature of 40–50% nickel iron and the core of soft iron.

We claim:

1. An electromagnetic force applying device comprising a core formed of a first magnetic material and having an annular gap, a winding on the core for producing a substantially radial magnetic field in the gap and an annular armature formed of a second magnetic material and which is drawn into said gap by said field, said armature and said core each being entirely comprised of said first and second magnetic materials, respectively, having respectively different coefficients of thermal expansion.

2. A device as claimed in claim 1 in which the core is formed of 40–50% nickel iron having a coefficient of thermal expansion of approximately 8 × 10⁻⁶ per °C and the armature is made of soft iron having a coefficient of thermal expansion of approximately 12 × 10⁻⁶ per °C.

* * * * *